Figure 1:
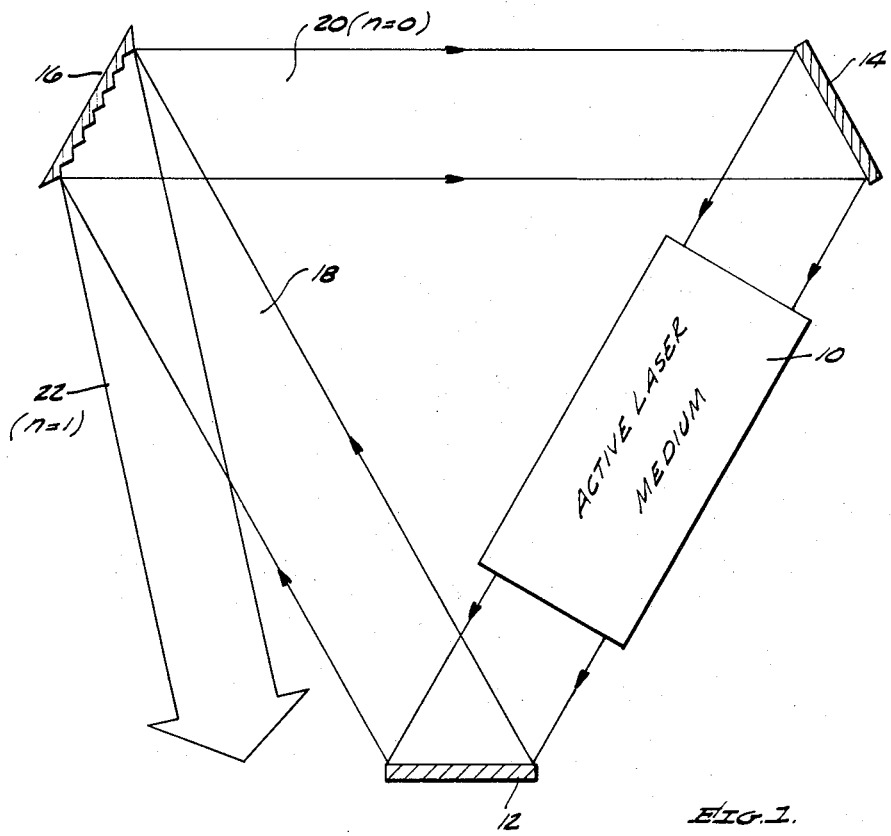

United States Patent
Janney

[15] 3,691,477
[45] Sept. 12, 1972

[54] DIFFRACTION GRATING COUPLED LASER RING RESONATORS

[72] Inventor: Gareth M. Janney, Pacific Palisades, Calif.

[73] Assignee: Hughes-Aircraft Company, Culver City, Calif.

[22] Filed: Sept. 4, 1970

[21] Appl. No.: 78,323

[52] U.S. Cl..............................331/94.5, 356/106 LR
[51] Int. Cl..............................H01s 3/00, G01b 9/02
[58] Field of Search................331/94.5; 356/106 LR

[56] References Cited

UNITED STATES PATENTS 3,586,995  6/1971  Hubach......................331/94.5

Primary Examiner—Ronald L. Wibert
Assistant Examiner—V. P. McGraw
Attorney—James K. Haskell and Paul M. Coble

[57] ABSTRACT

In the disclosed laser ring resonators a pair of mirrors and at least one diffraction grating are disposed relative to an active laser medium, such as $CO_2$, such that laser energy generated in the medium traverses a unidirectional closed circulation path through the medium. The diffraction grating has a groove spacing d related to the laser energy wavelength $\lambda$ by $1 < \lambda/d < 2$ and diffracts a portion of the incident laser energy along the circulation path and another portion out of the circulation path. A wavelength selecting embodiment utilizes two diffraction gratings in the circulation path through the laser medium, while a wavelength selecting and axial mode selecting embodiment further employs an additional mirror to provide an axial mode selecting closed optical path partially coincident with a wavelength selecting closed optical path through the laser medium.

10 Claims, 4 Drawing Figures

PATENTED SEP 12 1972 3,691,477

SHEET 1 OF 2

INVENTOR.
GARETH M. JANNEY,
BY
Paul M. Coble
ATTORNEY

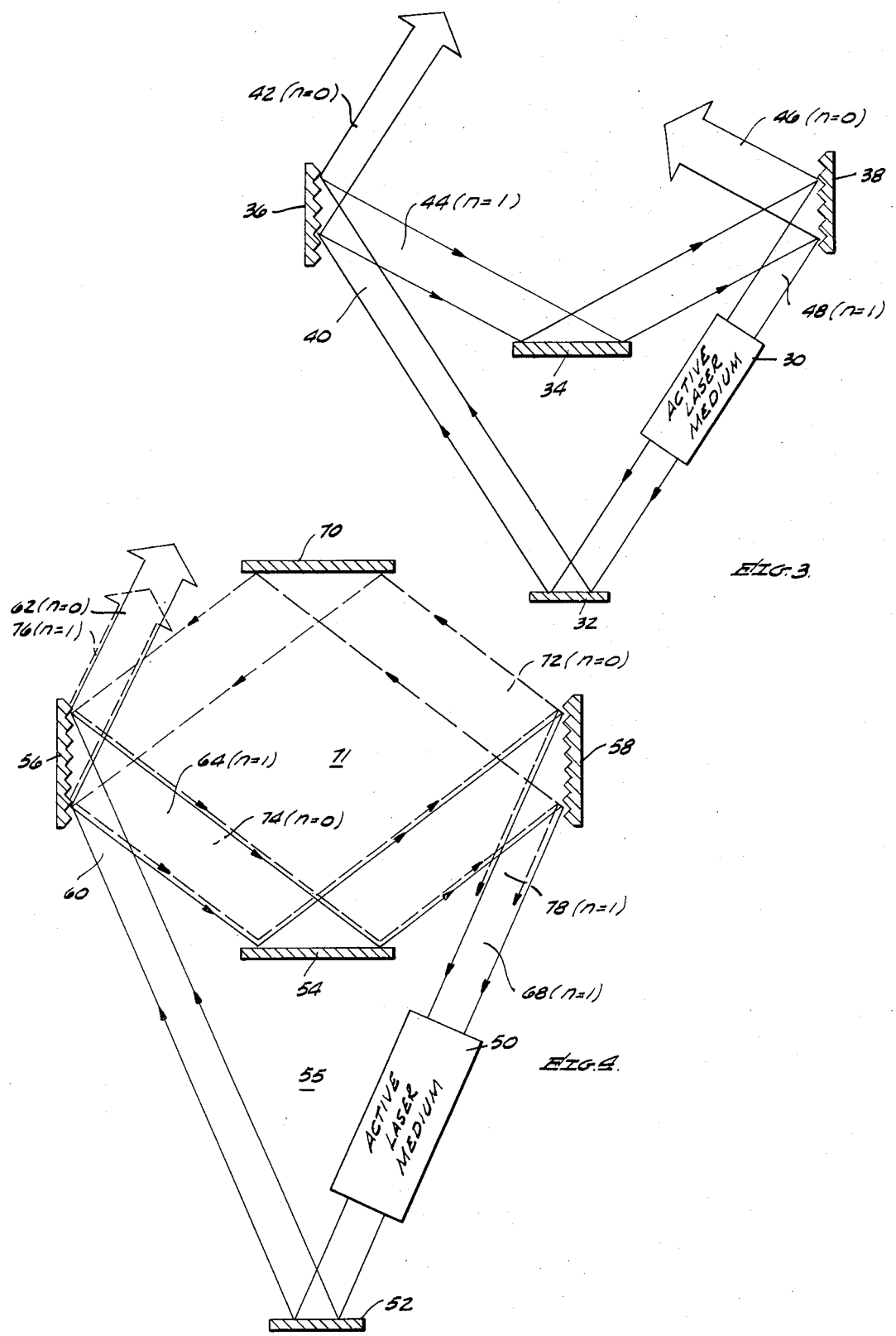

DIFFRACTION GRATING COUPLED LASER RING RESONATORS

The invention herein described was made in the course of or under a Contract or Subcontract thereunder with the United States Air Force.

This invention relates to lasers, and more particularly relates to laser ring resonators employing one or more diffraction gratings to couple energy out of the resonator.

In a laser ring resonator at least three laser energy reflecting elements are disposed relative to an active laser medium so as to cause laser energy generated in the medium to traverse a unidirectional closed circulation path through the medium. In one type of laser ring resonator according to the prior art, energy is coupled out of the resonator by means of a beam splitter which also functions as one of the energy reflecting elements. When beam splitter coupled laser ring resonators are operated at relatively high average power levels, e.g. greater than around a kilowatt, the beam splitter material becomes significantly absorptive at infrared wavelengths. This produces excessive heating which may result in destruction of the beam splitter coating and/or fracture of the beam splitter itself.

Another prior art laser ring resonator arrangement utilizes apertures in the reflecting elements to couple laser energy out of the resonator. This type of resonator produces laser beams of non-uniform cross-sectional area or intensity distribution, resulting in reduced efficiency when "hollow" beams traverse the laser medium. Moreover, it is very difficult to interferometrically recombine a plurality of such non-uniform circulating laser beams so as to produce a useful output.

Accordingly, it is an object of the present invention to provide a laser ring resonator which is operable at higher average power levels than laser ring resonators of the prior art, especially at infrared wavelengths.

It is a further object of the invention to provide a high power laser ring resonator in which laser energy is readily removed from the resonator without significantly altering the cross-sectional area or intensity distribution of the circulating laser beam.

It is a still further object of the invention to provide a laser ring resonator which additionally limits traveling-wave oscillation to a wavelength corresponding to a preselected laser transition in the active laser medium.

It is yet another object of the invention to provide a laser ring resonator in which traveling-wave oscillation is limited to both a preselected wavelength and a single axial mode.

In a laser ring resonator according to the invention an active laser medium, at least two optical energy reflecting devices, and a diffraction grating are disposed along a closed optical path through the laser medium and are oriented such that laser energy generated in the medium circulates unidirectionally along the closed optical path. The diffraction grating has a groove spacing such that a portion of the laser energy traveling along the closed optical path and incident on the grating is diffracted by the grating along the closed optical path, while another portion of the laser energy traveling along the closed path and incident on the grating is diffracted by the grating out of the closed optical path.

In a further embodiment of the invention affording laser wavelength selection an additional diffraction grating is coupled in the closed optical path.

In a still further embodiment of the invention two diffraction gratings are coupled in a wavelength selecting closed optical path through the laser medium, and an additional optical energy reflecting device provides in conjunction with the diffraction gratings an axial mode selecting closed optical path partially coincident with the wavelength selecting path.

Figure 2:
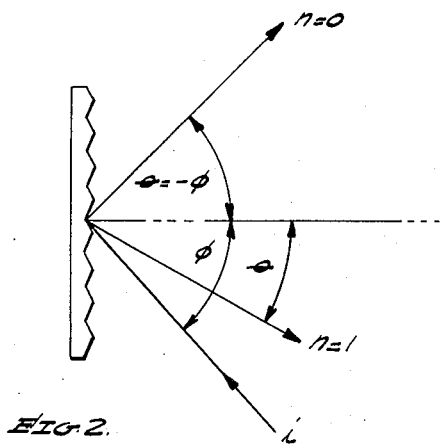

Additional objects, advantages and characteristic features of the present invention will become readily apparent from the following detailed description of the invention when considered in conjunction with the accompanying drawings in which:

FIG. 1 schematically illustrates a diffraction grating coupled laser ring resonator in accordance with one embodiment of the invention;

FIG. 2 is a diagram showing beam splitting properties of a typical diffraction grating which may be employed in a ring resonator according to the invention;

FIG. 3 schematically illustrates a wavelength selecting diffraction grating coupled laser ring resonator in accordance with another embodiment of the invention; and FIG. 4 is a schematic illustration of a wavelength and axial mode selecting diffraction grating coupled laser ring resonator in accordance with still another embodiment of the invention.

Referring to FIG. 1 with greater particularity, a diffraction grating coupled laser ring resonator according to the invention may be seen to include an active laser medium 10 which may be pumped to a lasing state by a pump source (not shown). An example of a particular laser medium 10 which may be employed is $CO_2$ operating to produce output laser energy at essentially $10.6\mu$, and in the ensuing discussion specific exemplary grating design parameters are given for this particular laser. However, it should be understood that other laser media including but not limited to ruby, Nd-YAG, helium-neon, and argon, for example, may be employed within the principles of the invention, although the invention is especially useful with lasers operating at infrared wavelengths.

A pair of optical energy reflecting devices, illustrated as mirrors 12 and 14, and a diffraction grating 16 are disposed at respective locations relative to the medium 10 and are oriented so as to reflect laser energy generated in the medium 10 into a unidirectional closed optical circulation path through the medium 10. The mirrors 12 and 14 are selected to have maximum reflectivity in the vicinity of the laser wavelength of interest ($10.6\mu$ in the case of a $CO_2$ laser medium), and may be of polished metal with an aluminum, silver, or gold coating, for example. The diffraction grating 16, which may also be of polished metal with an aluminum, silver, or gold coating, is provided with a series of parallel grooves of uniform spacing "$d$." The angle between the groove surface and the normal to the plane of the grating is referred to as the blaze angle.

In order to better understand the function and operation of the diffraction grating 16, reference may be made to FIG. 2 which illustrates the beam splitting properties of a typical diffraction grating. A beam of radiation incident on the diffraction grating at an angle $\Phi$ with respect to the normal to the grating is diffracted by the grating into n beams in accordance with the relation $$\sin \Phi + \sin \theta = n\lambda/d \quad (1)$$

where $\theta$ is the angle between the direction of diffraction and the normal to the grating, $n$ is an integer representing the order number of the diffracted beam, $\lambda$ is the wavelength of the radiation, and $d$ is the spacing between the grating grooves.

If, for a given wavelength $\lambda$, the groove spacing $d$ is selected such that $$1 < \lambda/d < 2 \quad (2)$$

then only two diffracted beams will be produced corresponding to the zero order ($n = 0$) and the first order ($n = 1$) for a given angle of incidence $\Phi$. This condition is illustrated in FIG. 2 where the incident beam i is shown diffracted into the zero order and first order beams designated $n = 0$ and $n = 1$, respectively.

In laser ring resonators according to the present invention the diffraction gratings are designed so that only the zero order and first order diffracted beams are produced. For example, for an active laser medium 10 of $CO_2$ producing radiation at a wavelength $\lambda = 10.6\mu$, a grating having 150 grooves per mm may be used. In this case the grating spacing $d = 6.7\mu$, and $\lambda/d = 1.59$. Using equation (1) it may be determined that for a selected angle of incidence $\Phi$ of 45°, for example, the first order ($n = 1$) diffracted beam will have an angle of diffraction $\theta$ of 62°. The zero order diffracted beam ($n = 0$) will be diffracted at an angle equal in magnitude but opposite in sign to the angle of incidence $\Phi$.

Thus, as may be seen from FIG. 1, the laser beam 18 which is incident upon diffraction grating 16 is diffracted by the grating 16 into a zero order ($n = 0$) diffracted beam 20 and a first order ($n = 1$) diffracted beam 22. The beam 20 is directed back into the laser medium 10 along the closed optical circulation path via the mirror 14, while the beam 22 constitutes the output beam from the resonator and is directed out of the optical circulation path.

The relative amounts of optical power which are diffracted into the $n = 0$ and $n = 1$ orders is a function of the blaze angle of the grating grooves, the angle of incidence of the radiation on the grating, and the polarization of the incident radiation. When $10.6\mu$ radiation is incident upon an aluminum coated grating having 150 grooves per mm at the aforementioned angle of incidence $\Phi$ of 45° (or on account of reciprocal properties of the grating at the aforementioned diffraction angle $\theta$ of 62°) with its electric field vector E polarized perpendicular to the length of the grating grooves, the relative mounts of power diffracted into the $n = 0$ and the $n = 1$ orders for several grating blaze angles is essentially as follows:

TABLE I

| Blaze Angle | Diffracted Power | |
|---|---|---|
| | $n = 0$ | $n = 1$ |
| 2° | 96% | 2% |
| 10° | 67% | 30% |
| 17° | 27% | 70% |
| 27° | 12% | 85% |
| 30° | 1% | 97% |

A small amount of power on the order of 2–3 percent is lost due to absorption and scattering.

In order to sustain oscillations, a $CO_2$ laser with an active medium length of one meter requires that at least about 67 percent of its emitted laser energy be fed back into the active medium. Thus, it may be seen from Table I that when such a laser is used as the active medium 10 in a ring resonator according to FIG. 1 with the aforementioned specific design parameters and with the $n = 0$ order diffracted beam recirculating through the laser medium, a blaze angle of essentially between 2° and 10° would be appropriate for the grating 16.

In a further embodiment of the invention, illustrated in FIG. 3, a diffraction grating coupled laser ring resonator is provided which selectively limits traveling-wave oscillation to a wavelength corresponding to a preselected laser transition (atomic or molecular) in the active laser medium. As shown in FIG. 3, active laser medium 30 is coupled in a ring resonator arrangement with mirrors 32 and 34 and a pair of diffraction gratings 36 and 38 which are disposed so as to provide a unidirectional closed circulation path for laser energy through the active medium 30. For an active medium 30 of $CO_2$, the aforementioned aluminum coated diffraction grating having 150 grooves per mm may be used for each of the gratings 36 and 38, for example, although other media and gratings are equally suitable.

In the particular embodiment illustrated in FIG. 3, laser beam 40 which is incident upon grating 36 is diffracted into a zero order ($n = 0$) beam 42 and a first order ($n = 1$) beam 44. The beam 42 constitutes an output beam from the ring resonator, while the beam 44 is directed along the laser energy circulation path. Beam 44 is reflected by mirror 34 onto diffraction grating 38 which diffracts this beam into a zero order ($n = 0$) beam 46 and a first order ($n = 1$) beam 48. The beam 46 is directed out of the ring resonator and may be used as an auxiliary output beam, while the beam 48 is fed back through the laser medium 30.

In order to insure that the amount of laser energy returned to the medium 30 is sufficient to sustain oscillations, the blaze angles of the gratings 36 and 38 may be determined in the manner discussed above with respect to Table I. Thus, as an example, when employing a $CO_2$ laser medium of one meter active length, aluminum coated diffraction gratings having 150 grooves per mm and angles of grating incidence and diffraction of 45° or 62° in the arrangement of FIG. 2, grating 36 may have a blaze angle of 17° and grating 38 a blaze angle of 37°. When these blaze angle values are used, approximately 68 percent of the laser energy will be returned to the medium 30.

Although the foregoing discussion has considered the laser medium as operating at a single wavelength (e.g. $10.6\mu$), laser media usually provide several transitions in the immediate vicinity of the specified wavelength. For example, while a $CO_2$ laser is normally specified to have an output wavelength of $10.6\mu$, a plurality of different transitions actually provide a plurality of output wavelengths ranging essentially from $9.7\mu$ to $10.8\mu$. From Equation (1) it will be apparent that for a fixed angle of incidence on a diffraction grating, the angle at which the first order beam will be diffracted varies as a function of the radiation wavelength. Thus, when the active medium 30 of the ring resonator of FIG. 3 generates laser energy at slightly different wavelengths, these different wavelengths will be diffracted by the gratings 36 and 38 into slightly different paths, and laser energy at only a particular wavelength will be recirculated through the medium 30. The ring resonator arrangement of FIG. 3 thus functions as a laser wavelength selector which limits traveling-wave oscillation to a wavelength corresponding to a preselected transition in the active laser medium 30. The two-grating ring resonator of FIG. 3 possesses an advantage over a single-grating arrangement according to FIG. 1 wherein the first order beam is circulated through the medium in that changes in the cross-section of the beam upon diffraction by one of the gratings are compensated for by equal and opposite changes upon diffraction by the other grating.

In a still further embodiment of the invention, illustrated in FIG. 4, a laser ring resonator is provided which affords both laser wavelength selection and axial mode selection. In the embodiment of FIG. 4 active laser medium 50 is coupled in a ring resonator arrangement with mirror 52, diffraction grating 56, mirror 54, and diffraction grating 58. The elements 52, 54, 56 and 58 are similar to respective elements 32, 34, 36 and 38 of the resonator of FIG. 3 and function as a primary, or wavelength selecting, resonator 55 which provides a unidirectional closed circulation path for laser energy through the active medium 50. The operation of the primary resonator 55 of FIG. 4 is the same as that of the ring resonator of FIG. 3, and laser beam paths in FIG. 4 which are equivalent to corresponding paths in FIG. 3 are shown in solid line in FIG. 4. Thus, beam 60 of FIG. 4 corresponds to beam 40 of FIG. 3; beam 64 to beam 44; beam 68 to beam 48; and beam 62 to beam 42.

In the embodiment of FIG. 4 an additional mirror 70 is disposed optically between diffraction gratings 56 and 58 so as to form in conjunction with mirror 54 and gratings 56 and 58 a secondary, or axial mode selecting, resonator 71 providing a closed optical energy circulation path shown in dashed line in FIG. 4. As may be seen from FIG. 4, the portion of the optical path of secondary resonator 71 between the diffraction gratings 56 and 58 via the mirror 54 is coincident with that of primary resonator 55. However, the zero order beam 72 diffracted by grating 58 (which corresponds to beam 46 of FIG. 3) is reflected by mirror 70 onto diffraction grating 56. The beam 72 is, in turn, diffracted by grating 56 into a zero order beam 74 and a first order beam 76. The mirror 70 is disposed so as to direct beam 72 onto the grating 56 at an angle of incidence such that the diffracted beam 76 is superimposed on the diffracted beam 62, resulting in interferometric combination of the beams 76 and 62 into a composite output beam. The diffracted beam 74, which is superimposed on diffracted beam 64, is reflected by mirror 54 onto grating 58. The beam 74 is, in turn, diffracted by grating 58 into the zero order diffracted beam 72 and a first order diffracted beam 78 which, along with beam 68, is fed back to the laser medium 50.

As was explained above with respect to the ring resonator of FIG. 3, the primary resonator 55 of FIG. 4 is designed to limit oscillation to a wavelength corresponding to a particular atomic or molecular transition in the laser medium 50. The energy circulation path length L around the secondary resonator 71 may be selected to limit oscillation to a single axial mode for the laser transition selected by the primary resonator 55. This may be achieved by making the path length $L$ such that the frequency separation $\Delta \nu = c/L$ (where $c$ is the velocity of light) between adjacent oscillatory modes of the resonator 71 is greater than the width of the atomic or molecular gain curve for the selected laser transition. For example, for transitions in most $CO_2$ lasers a secondary resonator path length $L$ of 4 meters or less will afford the desired single axial mode operation.

The particular gratings 56 and 58 used in the ring resonator of FIG. 4 should provide sufficient feedback of laser energy to the medium 50 to sustain oscillations. As an example, for a $CO_2$ laser medium of a one meter active length used with aluminum coated diffraction gratings having 150 grooves per mm in a resonator arrangement according to FIG. 4 in which the angles of grating incidence and diffraction are 45° or 62°, a blaze angle of 17° for the grating 56 and a blaze angle of 10° for the grating 58 should afford ample feedback to insure that oscillations will be sustained.

It is further pointed out that while the laser energy has been shown and described as circulating around the ring resonators of FIGS. 1, 3 and 4 in the clockwise sense, counterclockwise circulation is also possible. Circulation in the desired sense only may be insured by including a nonreciprocal optical element such as a Faraday isolator in the closed optical path.

Although the present invention has been shown and described with reference to particular embodiments, nevertheless, various changes and modifications obvious to one skilled in the art to which the invention pertains are deemed to lie within the spirit, scope and contemplation of the invention.

What is claimed is:

1. A laser ring resonator comprising:
    an active laser medium, at least two optical energy reflecting devices and a diffraction grating disposed along a closed optical path through said laser medium and oriented such that laser energy generated in said medium circulates unidirectionally along said path, said diffraction grating having a groove spacing such that a first portion of the laser energy traveling along said path and incident on said grating is diffracted by said grating along said path and a second portion of said traveling incident laser energy is diffracted by said grating out of said path.

2. A laser ring resonator according to claim 1 wherein the ratio of the wavelength of said circulating laser energy to said diffraction grating groove spacing is of a numerical value between 1 and 2.

3. A laser ring resonator according to claim 2 wherein said diffraction grating is oriented such that said first portion of laser energy is diffracted by said grating along the direction of the zero order of said grating and said second portion of laser energy is diffracted by said grating along the direction of the first order of said grating.

4. A laser ring resonator comprising:
    an active laser medium; a first optical energy reflecting device, a first diffraction grating, a second optical energy reflecting device, and a second diffraction grating successively disposed along a closed optical path through said laser medium and oriented such that laser energy generated in said medium circulates unidirectionally along said path; at least one of said first and second diffraction gratings having a groove spacing such that a first portion of the laser energy traveling along said path and incident on said one grating is diffracted by said one grating along said path and a second portion of said traveling incident laser energy is diffracted by said one grating out of said path.

5. A laser ring resonator according to claim 4 wherein the ratio of the wavelength of said circulating laser energy to said diffraction grating groove spacing is of a numerical value between one and two.

6. A laser ring resonator according to claim 5 wherein the other of said first and second diffraction gratings has a groove spacing such that a first portion of the laser energy traveling along said path and incident on said other grating is diffracted by said other grating along said path and a second portion of said traveling laser energy incident on said other grating is diffracted by said other grating out of said path.

7. A laser ring resonator comprising:
an active laser medium; a first optical energy reflecting device, a first diffraction grating, a second optical energy reflecting device, and a second diffraction grating successively disposed along a first closed optical path through said laser medium and oriented such that laser energy generated in said medium circulates unidirectionally along said first path; a third optical energy reflecting device disposed optically between said first and second diffraction gratings along a second closed optical path having a portion coincident with the portion of said first optical path extending between said first and second diffraction gratings via said second optical energy reflecting device; said first diffraction grating having a groove spacing and orientation such that a first portion of the laser energy traveling along said first path and incident on said first grating is diffracted by said first grating into a selected path out of said first and second paths and a second portion of the laser energy traveling along said first path and incident on said first grating is diffracted by said first grating along said coincident portion of said first and second paths, while a first portion of the laser energy traveling along said second path and incident on said first grating is diffracted by said first grating along said coincident portion of said first and second paths, and a second portion of the laser energy traveling along said second path and incident on said first grating is diffracted by said first grating into said selected path; said second grating having a groove spacing and orientation such that a first portion of the laser energy traveling along said coincident portion of said first and second paths and incident on said second grating is diffracted by said second grating along said second path, and a second portion of the laser energy traveling along said coincident portion of said first and second paths and incident on said second grating is diffracted by said second grating along said first path.

8. A laser ring resonator according to claim 7 wherein the ratio of the wavelength of said circulating laser energy to the groove spacing of each of said first and second diffraction gratings is of a numerical value between one and two.

9. A laser ring resonator according to claim 8 wherein said first diffraction grating is oriented such that said first portion of laser energy diffracted by said first grating from said first path is diffracted along the direction of the zero order of said first grating, said second portion of laser energy diffracted by said first grating from said first path is diffracted along the direction of the first order of said first grating, said first portion of laser energy diffracted by said first grating from said second path is diffracted along the direction of the zero order of said first grating, and said second portion of laser energy diffracted by said first grating from said second path is diffracted along the direction of the first order of said first grating; said second grating being oriented such that said first portion of laser energy diffracted by said second grating is diffracted along the direction of the zero order of said second grating, and said second portion of laser energy diffracted by said second grating is diffracted along the direction of the first order of said second grating.

10. A laser ring resonator according to claim 7 wherein the length of said second closed optical path is of a selected value permitting only a single axial mode of laser oscillation.

* * * * *